United States Patent
Magro et al.

(10) Patent No.: US 6,721,816 B1
(45) Date of Patent: Apr. 13, 2004

(54) SELECTING INDEPENDENTLY OF TAG VALUES A GIVEN COMMAND BELONGING TO A SECOND VIRTUAL CHANNEL AND HAVING A FLAG SET AMONG COMMANDS BELONGING TO A POSTED VIRTUAL AND THE SECOND VIRTUAL CHANNELS

(75) Inventors: James R. Magro, Austin, TX (US); Stephen C. Ennis, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 225 days.

(21) Appl. No.: 10/083,874

(22) Filed: Feb. 27, 2002

(51) Int. Cl.$^7$ .............................................. G06F 13/14
(52) U.S. Cl. ................. 710/6; 710/5; 710/36; 710/39; 710/40; 710/240; 710/244
(58) Field of Search ............................ 710/5, 6, 36, 39, 710/40, 52, 107, 112, 240, 244; 711/118, 138, 158

(56) References Cited

U.S. PATENT DOCUMENTS

| | | | |
|---|---|---|---|
| 5,751,951 A | | 5/1998 | Osborne et al. |
| 5,809,328 A | | 9/1998 | Nogales et al. |
| 6,278,532 B1 | | 8/2001 | Heimendinger et al. |
| 6,414,525 B2 | | 7/2002 | Urakawa |
| 6,414,961 B1 | | 7/2002 | Katayanagi |
| 6,539,439 B1 | * | 3/2003 | Nguyen et al. ............... 710/52 |
| 6,557,048 B1 | * | 4/2003 | Keller et al. ................... 710/6 |
| 2002/0062427 A1 | * | 5/2002 | Chauvel et al. ............. 711/151 |
| 2002/0174229 A1 | * | 11/2002 | Owen et al. ................. 709/227 |
| 2002/0174299 A1 | * | 11/2002 | Hayter et al. ............... 711/118 |
| 2003/0095557 A1 | * | 5/2003 | Keller et al. ................. 370/412 |
| 2003/0097500 A1 | * | 5/2003 | Ennis ........................... 710/52 |

OTHER PUBLICATIONS

U.S. patent application Ser. No. 09/399,281, filed Sep. 17, 1999.

* cited by examiner

*Primary Examiner*—Ilwoo Park
(74) *Attorney, Agent, or Firm*—Meyertons Hood Kivlin Kowert & Goetzel, P.C.; B. Noël Kivlin

(57) ABSTRACT

An arbitration mechanism for an input/output node of a computer system. An arbitration mechanism includes a buffer circuit for storing received control commands corresponding to a posted virtual channel and a second virtual channel. Each of the control commands includes an identifier value indicative of the source of the control command. A tag circuit that may generate a tag value for each of the control commands prior to the control commands being stored. The tag value may be indicative of an order of receipt of each of the control commands relative to other control commands and may be dependent upon the identifier value. In addition, an arbitration circuit may arbitrate between control commands stored within the buffer circuit dependent upon the tag value of each of the control commands. The arbitration circuit may select, independently of the tag values, a given control command and having a flag bit set.

20 Claims, 4 Drawing Sheets

US 6,721,816 B1

SELECTING INDEPENDENTLY OF TAG VALUES A GIVEN COMMAND BELONGING TO A SECOND VIRTUAL CHANNEL AND HAVING A FLAG SET AMONG COMMANDS BELONGING TO A POSTED VIRTUAL AND THE SECOND VIRTUAL CHANNELS

BACKGROUND OF THE INVENTION

1. Field of the Invention

This invention relates to computer system input/output (I/O) and, more particularly, to transaction handling within an I/O node.

2. Description of the Related Art

In a typical computer system, one or more processors may communicate with input/output (I/O) devices over one or more buses. In addition those processors may communicate with each other through an additional bus or buses. In many cases, these buses are shared buses.

Unfortunately, many shared bus systems suffer from drawbacks. For example, multiple devices attached to a bus may present a relatively large electrical capacitance to devices driving signals on the bus. In addition, the multiple attach points on a shared bus produce signal reflections at high signal frequencies which reduce signal integrity. As a result, signal frequencies on the bus are generally kept relatively low in order to maintain signal integrity at an acceptable level. The relatively low signal frequencies reduce signal bandwidth, limiting the performance of devices attached to the bus.

Lack of scalability to larger numbers of devices is another disadvantage of shared bus systems. The available bandwidth of a shared bus is substantially fixed (and may decrease if adding additional devices causes a reduction in signal frequencies upon the bus). Once the bandwidth requirements of the devices attached to the bus (either directly or indirectly) exceeds the available bandwidth of the bus, devices will frequently be stalled when attempting access to the bus, and overall performance of the computer system including the shared bus will most likely be reduced. An example of a shared bus used by many systems is a front side bus (FSB), which may typically interconnect one or more processors and a system controller.

To overcome some of the drawbacks of a shared bus, some computers systems may use packet-based communications such as point-to-point links, for example, between devices or nodes. In such systems, nodes may communicate with each other by exchanging packets of information. In general, a "node" is a device which is capable of participating in transactions upon an interconnect. For example, the interconnect may be packet-based, and the node may be configured to receive and transmit packets. Generally speaking, a "packet" is a communication between two nodes: an initiating or "source" node which transmits the packet and a destination or "target" node which receives the packet. When a packet reaches the target node, the target node accepts the information conveyed by the packet and processes the information internally. A node located on a communication path between the source and target nodes may relay or forward the packet from the source node to the target node.

Many I/O bridging devices use a buffering mechanism to buffer a number of pending transactions from a peripheral bus to a final destination bus. However buffering may introduce stalls on the peripheral bus. Stalls may be caused when a series of transactions are buffered in a queue and awaiting transmission to a destination bus and a stall occurs on the destination bus, which stops forward progress. Then a transaction that will allow those waiting transactions to complete arrives at the queue and is stored behind the other transactions. To break the stall, the transactions in the queue must somehow be reordered to allow the newly arrived transaction to be transmitted ahead of the pending transactions. Thus to prevent scenarios such as this, peripheral buses such as the PCI bus prescribe a set of ordering rules that govern the handling and ordering of PCI bus transactions.

In nodes that bridge transactions having a set of ordering rules from one type of bus to a different bus such as a packet bus, the packet bus may also need to constrain the transactions to the same or a similar set of ordering rules. When these nodes buffer the transactions, an arbitration mechanism may select winning transactions while allowing the buffered transactions to be reordered. Depending on the complexity of the ordering rules, particularly between transactions having different origins, performance may be effected.

SUMMARY OF THE INVENTION

Various embodiments of an arbitration mechanism for an input/output node of a computer system are disclosed. In one embodiment, an arbitration mechanism includes a buffer circuit for storing received control commands within a first and second buffer. The first buffer may correspond to a posted virtual channel and the second buffer may correspond to a second virtual channel. Each of the control commands corresponds to one of the virtual channels and includes an identifier value. The identifier value may be indicative of the source of the control command. The mechanism also includes a tag circuit that is coupled to the buffer circuit and may generate a tag value for each of the control commands prior to the control commands being stored within the buffer circuit. The tag value may be indicative of an order of receipt of each of the control commands relative to other control commands and may be dependent upon the identifier value. In addition, the mechanism includes an arbitration circuit that may arbitrate between control commands stored within the first buffer and the second buffer dependent upon the tag value of each of the control commands. However, during arbitration, each control command belonging to the second virtual channel may further include a flag bit which indicates that the arbitration circuit may select, independently of the tag values, a given control command having the flag bit set.

In one particular implementation, the tag circuit may compare the identifier values of the control commands stored within the first buffer to the identifier value of each of the control commands belonging to the second virtual channel that is received.

In another implementation, the tag circuit may set the flag bit if the identifier value of the given one of the control commands is different than the identifier values of the posted control commands stored within the first buffer.

Figure 1:
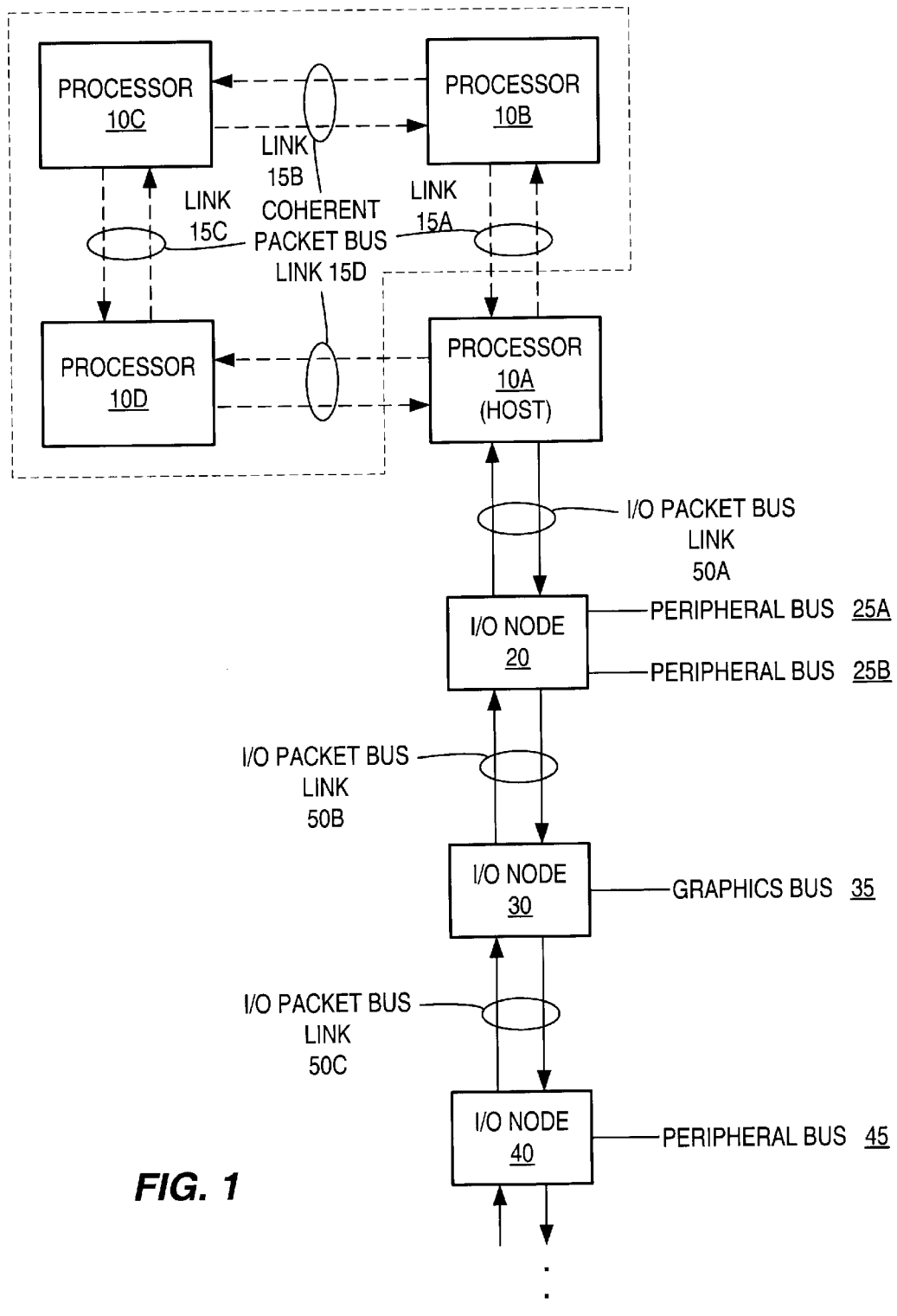
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Turning now to FIG. 1, a block diagram of one embodiment of a computer system is shown. The computer system includes processors 10A–10D each interconnected by a coherent packet bus including links 15A–D. Each link of coherent packet bus 15 may form a high-speed point-to-point link. The computer system also includes three I/O nodes numbered 20, 30 and 40 each connected together in a chain by non-coherent (NC) packet bus links 50B and 50C respectively. NC packet bus link 50A is coupled between host node/processor 10A and I/O node 20. Processor 10A is illustrated as a host node and may include a host bridge for communicating with I/O node 20 via NC packet bus link 50A. Processors 10B–D may also include host bridges for communication with other I/O nodes (not shown). The NC packet bus links formed by NC packet bus 50A–C may also be referred to as a point-to-point links. I/O node 20 is connected to a pair of peripheral buses 25A–B. I/O node 30 is connected to a graphics bus 35, while I/O node 40 is connected to an additional peripheral bus 45. It is noted that in other embodiments, other numbers of processors may be used.

In the present embodiment, each link of coherent packet bus 15 is implemented as sets of unidirectional lines (e.g. lines 15A are used to transmit packets between processor 10A and processor 10B and lines 15B are used to transmit packets between processor 10B and processor 10C). Other sets of lines 15C–D are used to transmit packets between other processors as illustrated in FIG. 1. The coherent packet bus 15 may be operated in a cache coherent fashion for communication between processing nodes ("the coherent link"). Further, non-coherent packet bus 50 may be operated in a non-coherent fashion for communication between I/O nodes and between I/O nodes and a host bridge such as the host bridge of processor 10A ("the non-coherent link"). The interconnection of two or more nodes via coherent links may be referred to as a "coherent fabric". Similarly, the interconnection of two or more nodes via non-coherent links may be referred to as a "non-coherent fabric". It is noted that a packet to be transmitted from one processor to another may pass through one or more intermediate nodes. For example, a packet transmitted by processor 10A to processor 10C may pass through either processor 10B or processor 10D as shown in FIG. 1. Any suitable routing algorithm may be used.

Processors 10A–10D are each illustrative of, for example, an x86 microprocessor such as an Athlon™ microprocessor. In addition, one example of a packet bus such as non-coherent packet bus 50 may be compatible with HyperTransport™ technology. Peripheral buses 25A, 25B and 45 are illustrative of a common peripheral bus such as a peripheral component interconnect (PCI) bus and graphics bus 35 is illustrative of an accelerated graphics port (AGP) interconnect, for example. It is understood, however, that other types of processors and buses may be used.

It is noted that while three I/O nodes are shown connected to host processor 10A, other embodiments may have other numbers of nodes and those nodes may be connected in other topologies. The chain topology illustrated in FIG. 1 is shown for its ease of understanding.

In the illustrated embodiment, the host bridge of processor 10A may receive upstream packet transactions from downstream nodes such as I/O node 20, 30 or 40. Alternatively, the host bridge of processor 10A may transmit packets downstream to devices such as peripheral devices (not shown) that may be connected to peripheral bus 25A for example.

Generally speaking, a packet is a communication between two nodes (an initiating node which transmits the packet and a destination node which receives the packet). The initiating node and the destination node may differ from the source and target node of the transaction of which the packet is a part, or either node may be either the source node or the target node. A control packet is a packet carrying control information regarding the transaction. Certain control packets specify that a data packet follows. The data packet carries data corresponding to the transaction and corresponding to the specifying control packet. In one embodiment, control packets may include command packets, info packets and response packets. It is noted that other embodiments are contemplated which include other types of packets.

As packets travel upstream or downstream on the non-coherent links or between coherent nodes on the coherent links, the packets may pass through one or more nodes. As used herein, "upstream" refers to packet traffic flow in the direction of the host bridge of processor 10A from an I/O node and "downstream" refers to packet traffic flow in the direction away from the host bridge of processor 10A to an I/O node. As will be described in greater detail below, to preserve the ordering rules of the various buses that may be connected to a given I/O node, the node may provide transaction reordering as well as packet buffering. Likewise, other nodes may include buffers for preventing commands from blocking each other due to logical conflicts between packets of a given type.

Generally speaking, a "virtual channel" is a communication path for carrying packets between various processors and I/O nodes. Each virtual channel is resource independent of the other virtual channels (i.e. packets flowing in one virtual channel may be given separate and independent resources such that they are generally not affected, in terms of physical transmission, by the presence or absence of packets in another virtual channel due to buffer management and routing issues). Packets are assigned to a virtual channel based upon packet type. Packets in the same virtual channel may physically conflict with each other's transmission (i.e. packets in the same virtual channel may experience resource conflicts) and may not physically conflict with the transmission of packets in a different virtual channel.

For example, if a first packet, for logical/protocol reasons, must arrive at its destination node before a second packet arrives at its destination node, it is possible that a computer system could deadlock if the second packet physically blocks the first packet's transmission (by occupying conflicting resources). As will be described further below, deadlock-free operation may be achieved by assigning the first and second packets to separate virtual channels, and by implementing the transmission medium such that packets in separate virtual channels may not physically block each other's transmission. However, certain packets may logically conflict with other packets (i.e. for protocol reasons, coherency and ordering reasons, or other such reasons, one packet may logically conflict with another packet). Thus to maintain I/O ordering, some ordering rules may cause dependencies between packets originating at the same node but travel within different virtual channels. These dependencies may cause one packet traveling in one virtual channel to logically block a packet traveling on a different virtual channel. It is noted that the packets from different virtual channels are transmitted over the same physical links. Thus, a separate receiving buffer for each virtual channel may be available prior to transmission.

In one embodiment, control packets include commands such as posted and non-posted writes, and non-posted reads. In addition, control packets include responses. Thus, to support operation as described above, the non-coherent packet interface may support three virtual channels corresponding to the three types of commands: non-posted, posted and response. It is noted however, that in other embodiments, other virtual channels are contemplated and may be used and supported.

During operation, I/O node 20 and 40 may translate PCI bus transactions into upstream packet transactions that travel in I/O streams and additionally may translate downstream packet transactions into PCI bus transactions. All packets originating at nodes other than the host bridge of processor 10A may flow upstream to the host bridge of processor 10A before being forwarded to any other node. All packets originating at the host bridge of processor 10A may flow downstream to other nodes such as I/O node 20, 30 or 40. Each I/O stream may be identified by an identifier called a Unit ID. It is contemplated that the Unit ID may be part of a packet header or it may be some other designated number of bits in a packet or packets. As used herein, "I/O stream" refers to all packet transactions that contain the same Unit ID and therefore originate from the same node.

To illustrate, a peripheral device on peripheral bus 45 initiates a transaction directed to a peripheral device on peripheral bus 25. The transaction may first be translated into one or more packets with a unique Unit ID and then transmitted upstream. It is noted that each packet may be encoded with specific information which identifies the packet. For example the Unit ID may be encoded into the packet header. Additionally, the type of transaction may also be encoded into the packet header. Each packet may be assigned a Unit ID that identifies the originating node. In the present embodiment, I/O node 20 may not forward packets to a peripheral device on peripheral bus 25 from downstream; the packets are first transmitted upstream to the host bridge of processor 10A. The host bridge of processor 10A may then transmit or "reflect" the packets back downstream with a Unit ID of the host bridge of processor 10A where I/O node 20 recognizes and claims the packet for the peripheral device on peripheral bus 25. I/O node 20 may then translate the packets into peripheral bus transactions and transmit the transactions to the peripheral device on peripheral bus 25. Further, transactions originating at the host bridge of processor 10A will also contain the Unit ID of the host bridge of processor 10A. However, as will be described further below, certain packets that are transmitted downstream will contain the Unit ID of the sending device.

As the packet transactions travel upstream or downstream, the packets may pass through one or more I/O nodes. The pass-through is sometimes referred to as a tunnel and the I/O node is sometimes referred to as a tunnel device. Packets that are sent from upstream to downstream or from downstream to upstream are referred to as "forwarded" traffic. Additionally, packet traffic that originates at a particular I/O node and is inserted into the upstream traffic is referred to as "injected" traffic.

As will be described in greater detail below, to preserve the ordering rules of the various buses that may be connected to an I/O node and to avoid possible system deadlocks, the I/O node may provide transaction reordering as well as packet buffering. The I/O node may also include control logic which controls the flow of packets into and out of the tunnel by both forwarded and injected traffic.

Figure 2:
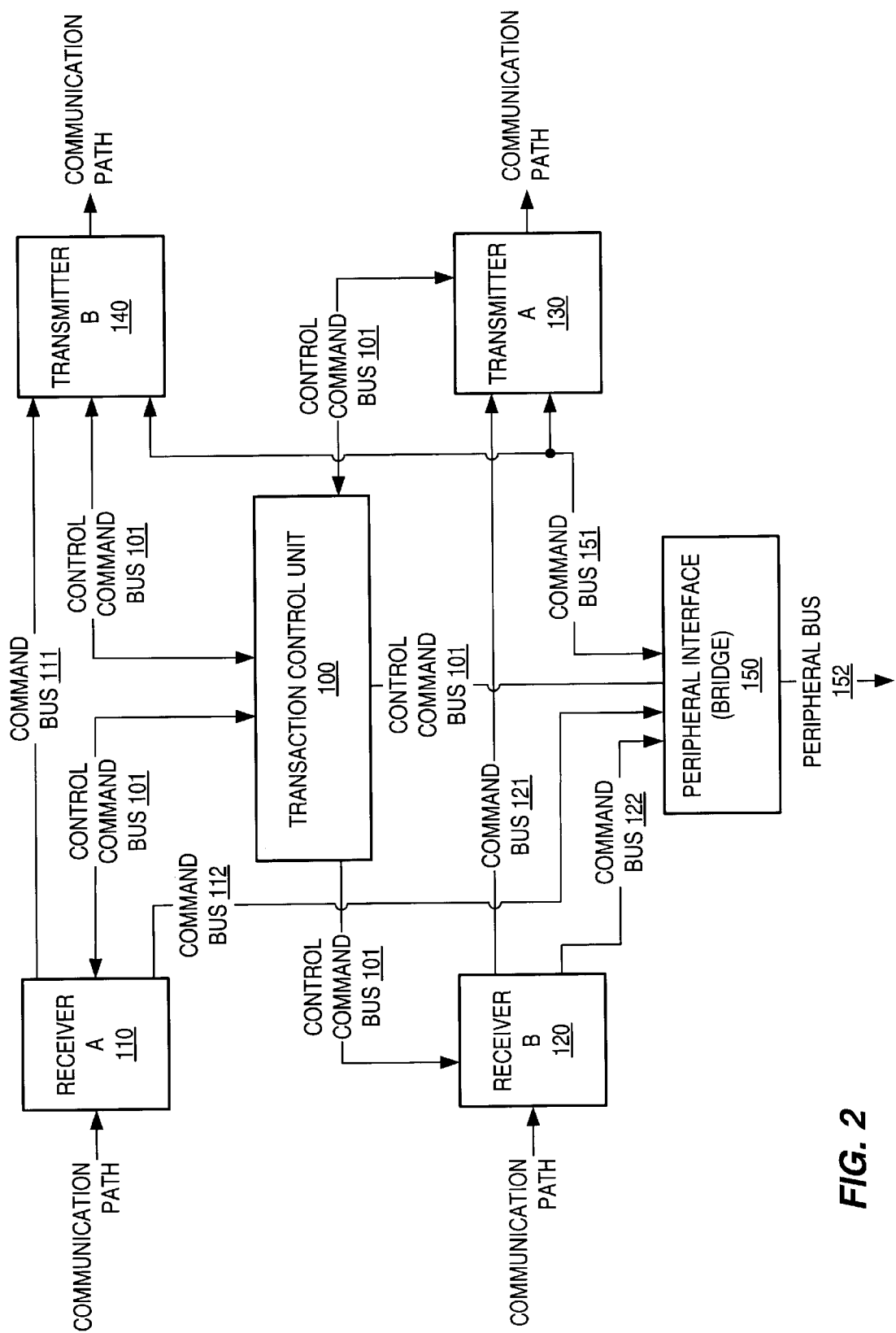
FIG. 2 is a block diagram of one embodiment of an I/O node.

Referring to FIG. 2, a block diagram of one embodiment of an I/O node is shown. The I/O node is representative of any of I/O nodes 20, 30 or 40 of FIG. 1 and will hereafter be referred to as I/O node 20 for simplicity. I/O node 20 of FIG. 2 includes a receiver 110 which is coupled to a transmitter 140 via a command bus 111 and to peripheral interface 150 via a command bus 112. I/O node 20 also includes a receiver 120 which is coupled to a transmitter 130 via a command bus 121 and to peripheral interface 150 via a command bus 122. Peripheral interface 150 is also coupled to transmitters 130 and 140 via a command bus 151 and to peripheral bus 152. Additionally, I/O node 20 includes a transaction control unit 100 which is coupled to each receiver, each transmitter and to peripheral interface via a control command bus 101. As used herein, a command bus is meant to include signals for command, control and data. Therefore, when a transaction or a command is referred as being sent over a respective command bus it includes command and data bits.

In the illustrated embodiment, receiver 110 and transmitter 140 form one communication path of the I/O tunnel and receiver 120 and transmitter 130 form a second communication path of the I/O tunnel. Since each of the communication paths is unidirectional, either path may be connected as the upstream or downstream path. Thus, the injected traffic from peripheral interface 150 is provided to either of transmitters 130 and 140.

Receivers 110 and 120 each receive packets into a receive buffer (not shown). As each packet is received, a control command is generated containing a subset of the information contained in the received packet. The control command may include several fields including the Unit ID of the originating node, destination information, a data count and the type command or virtual channel it belongs to, for example. It is noted that the control command may include other information or may not include some of the information described above. Receivers 110 and 120 send each control command to transaction control unit 100.

In response to peripheral interface 150 receiving transactions from peripheral bus 152, peripheral interface 150 may also generate control commands containing information similar to the control commands described above. Peripheral interface 150 may also store the transactions in one or more buffers and send the corresponding control commands to transaction control unit 100.

Transaction control unit 100 may store each control command that it receives into one or more buffer structures in the order that they were received. Based on the control commands that transaction control unit 100 stores in its buffers, transaction control unit 100 may decide the order that the corresponding commands waiting in source buffers (i.e. receiver and/or peripheral interface) may be sent. As will be described in greater detail below in conjunction with FIG. 3 and FIG. 4, transaction control unit 100 may arbitrate between transactions in its buffers and may be responsible for the overall flow of transactions through the tunnel of an I/O node.

Once transaction control unit 100 arbitrates which transaction will be processed, transaction control unit 100 may direct the respective source device to send a pending transaction to the destination device. For example, the transaction control unit 100 selects a control command from its buffer that is representative of one or more packets being forwarded from receiver 110 to transmitter 140. Transaction control unit 100 notifies receiver 110 to send the packet(s) to transmitter 140 via command bus 111. Transmitter 140 may then transmit the packet(s) to the next node in the chain. The next node may be another I/O node which is either upstream or downstream, or it may be a host node such as host processor 10A of FIG. 1. In addition, transaction control unit 100 and transmitter 140 may include logic (not shown) which indicates to another node whether or not there is free space in the receive buffer.

Figure 3:
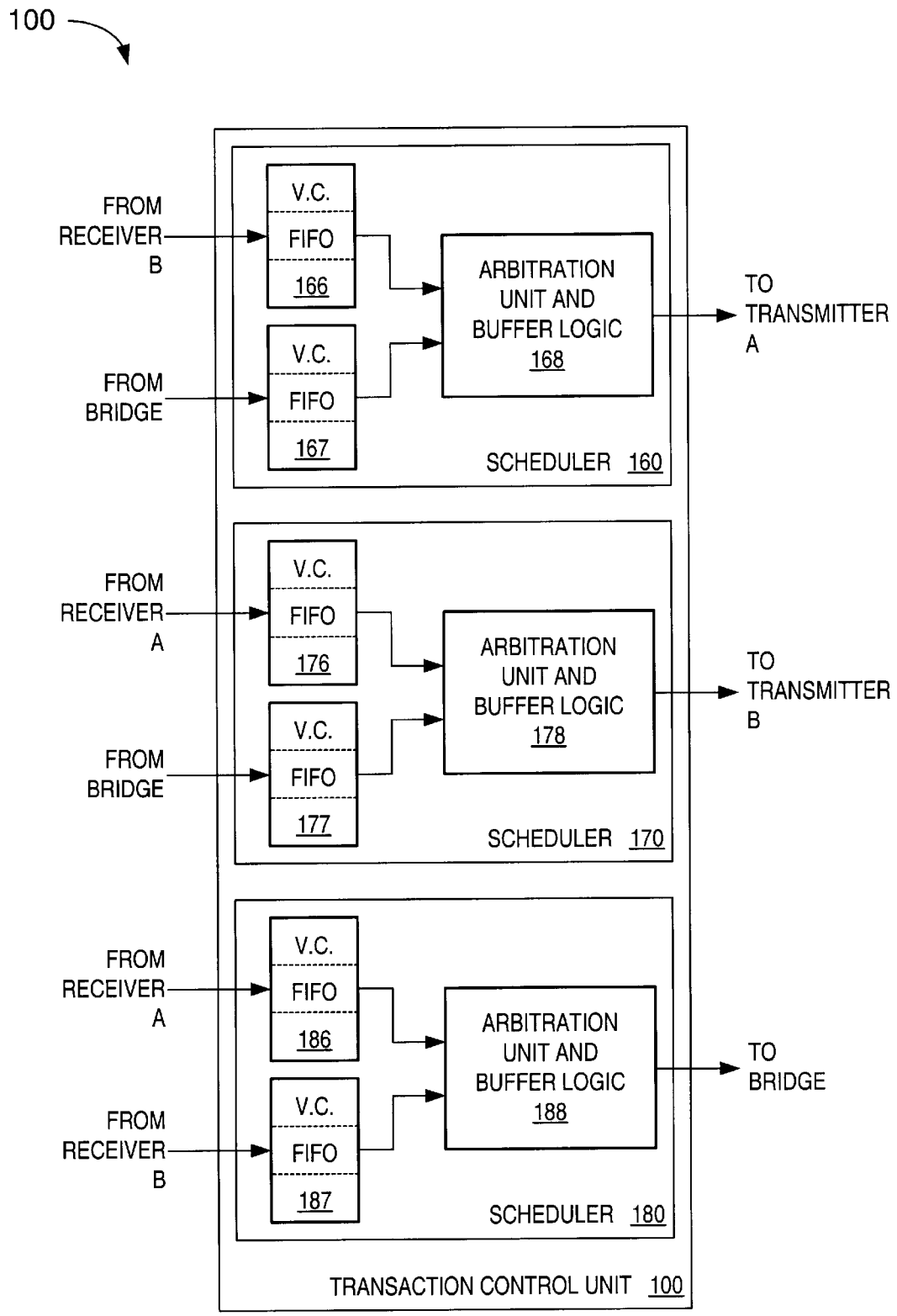
FIG. 3 is a block diagram of one embodiment of a transaction control unit.

Turning to FIG. 3, a block diagram of one embodiment of a transaction control unit is shown. Circuit components that correspond to those shown in FIG. 2 are numbered identically for simplicity and clarity. Transaction control unit 100 includes three schedulers labeled 160, 170 and 180, respectively. Each of schedulers 160, 170 and 180 include a pair of virtual channel command buffers and an arbiter and buffer management unit. The virtual channel command buffers of scheduler 160 are labeled V.C. FIFO 166 and 167 and arbiter and buffer management unit is numbered 168. Likewise, virtual channel command buffers of scheduler 170 are labeled V.C. FIFO 176 and 177 and arbiter and buffer management unit is numbered 178 and virtual channel command buffers of scheduler 180 are labeled V.C. FIFO 186 and 187 and arbiter and buffer management unit is numbered 188.

Each scheduler corresponds to a particular destination and to two sources. In the illustrated embodiment, scheduler 160 controls transactions that have transmitter 130 of FIG. 2 as a destination and receiver 120 and peripheral interface/bridge 150 as sources. Similarly, scheduler 170 of FIG. 3 controls transactions that have transmitter 140 of FIG. 2 as a destination and receiver 110 and bridge 150 as sources. Lastly, scheduler 180 of FIG. 3 controls transactions that have bridge 150 of FIG. 2 as a destination and receiver 110 and receiver 120 as sources. In FIG. 3, each virtual channel command buffer receives from a respective receiver or bridge, control commands corresponding to packets received by the respective receiver or bridge. In one embodiment, a control command may include a destination bit designating which scheduler the control command will be sent to. Typically a control command will have only one destination bit set. However, in the event that a transaction is a broadcast message, more than one destination bit may be set to allow more than one scheduler to receive the control command.

To simplify the discussion, only scheduler 160 will be described in detail. As control commands are received into V.C. FIFO 166 or 167, they are placed into a respective FIFO section depending on the type of transaction. Since V.C. FIFO 166 and 167 are identical, only V.C. FIFO 166 will be described in detail. V.C. FIFO 166 contains three separate FIFO sections corresponding to the three types of control packets (e.g. posted, non-posted and response) described above. The control commands are placed into the respective FIFO in the order in which they were received. However, to maintain ordering rules associated with the various bus or type of device that may have generated the original command and to avoid any possible resulting deadlocks, the transactions may have to be processed out of order between different virtual channels.

As will be described in greater detail below in conjunction with FIG. 4, tagging logic may assign a tag to each incoming command and arbiter and buffer management logic 168 may be configured to use the tag to arbitrate which control command may be processed first, second and so on between control commands stored in V.C. FIFO 166 or V.C. FIFO 167. For example, a posted command which arrives in V.C. FIFO 166 before a response command may be processed after the response command due to the ordering rules. Further, arbiter and buffer management logic 168 may also arbitrate from which V.C. FIFO a transaction may be processed based on a set of fairness rules and whether or not space is available in a receive buffer of the next I/O node or the host bridge. If the destination is bridge 150 of FIG. 2, the particular arbitration rules may be different than the arbitration rules described above. In addition, tagging logic may use the Unit ID of a control command when assigning the tags to implement latency reduction for some control commands that may be otherwise unnecessarily blocked.

Figure 4:
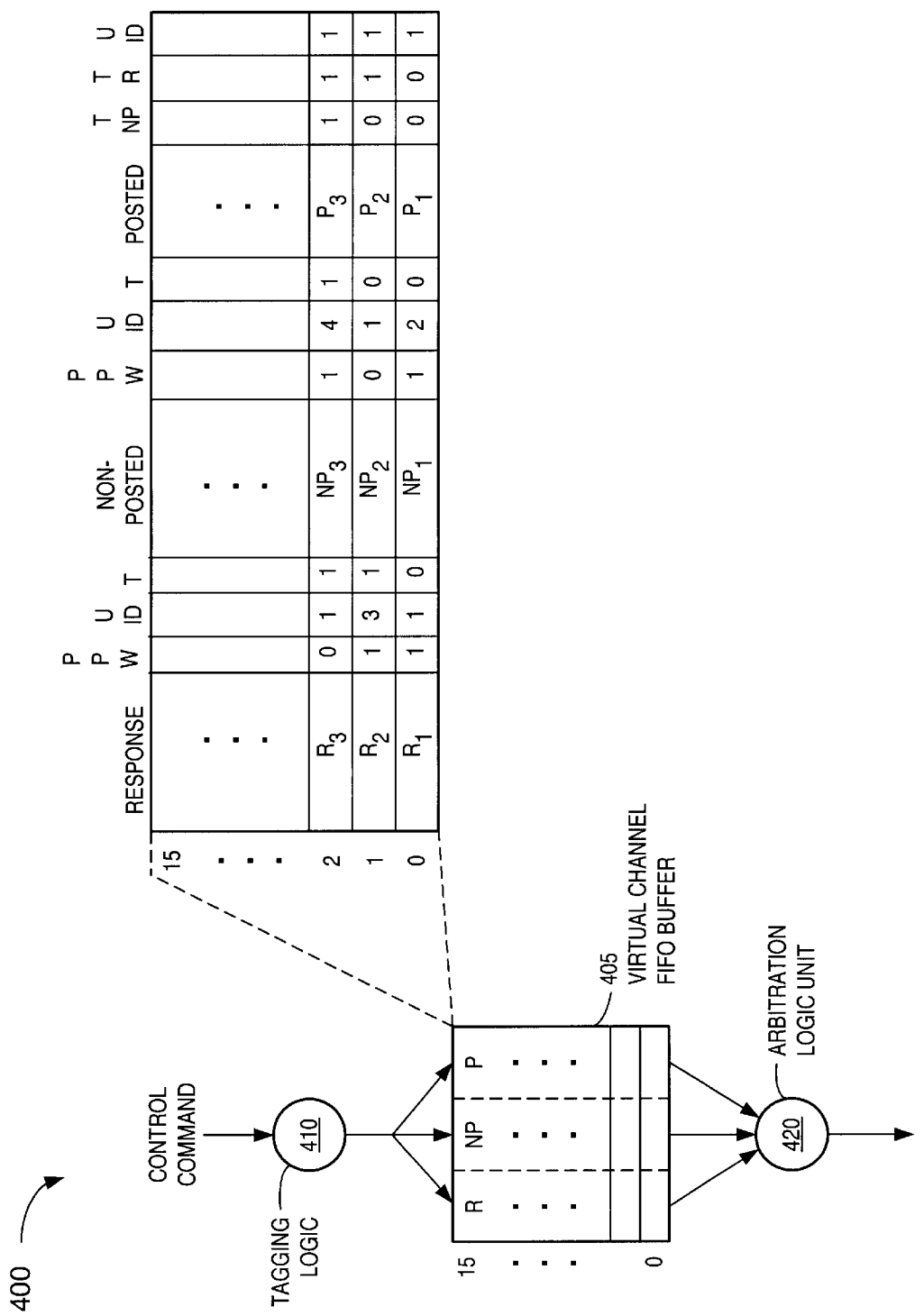
FIG. 4 is a block diagram of one embodiment of a scheduler including an arbitration mechanism.

Turning to FIG. 4, a block diagram of one embodiment of a scheduler including an arbitration mechanism is shown. Scheduler 400 is similar to any of schedulers 160, 170, 180 of FIG. 3, however some components are not shown for clarity. Scheduler 400 includes tagging logic 410 which is coupled to a virtual channel FIFO buffer 405. Virtual channel FIFO buffer 405 includes three separate buffer queues corresponding to the three types of virtual channels and their corresponding control commands: posted, non-posted and response. An arbitration logic unit 420 is coupled to virtual channel FIFO buffer 405. In addition, an exploded view of one embodiment of virtual channel FIFO buffer 405 is shown. The exploded view illustrates some of the fields of the control commands in more detail.

In the exploded view, each control command stored within a respective virtual channel buffer includes a tag value. Further, the posted channel commands have two tags: one which corresponds to the Response channel (TR) and one which corresponds to the Non-posted channel (TNP). In addition, each control command includes a field specifying the Unit ID (UID) of the sending device. Lastly, the Non-Posted and Response channels each include a Pass Posted Write bit (PPW). The commands shown in the exploded view correspond to the control commands described in conjunction with Table 3 below.

The PPW bit of a packet may typically be set by a sending device to indicate whether a given non-posted or response packet may pass a posted packet during arbitration. As described above, the UID may be used not only to identify which device sent a given packet, but to also identify the I/O stream that a packet belongs to. The tags will be described in more detail below.

Tagging logic 410 may assign a tag to each control command prior to the control command being stored in virtual channel FIFO buffer 405. Control commands may be assigned tags in the order they are received from a source unit such as receiver 120 or bridge 150 of FIG. 2. The tags may be appended to the control command.

In one embodiment, the tags may be four bits wide since virtual channel FIFO buffer 405 may be up to 16 locations deep. It is noted however that in other embodiments, virtual channel FIFO buffer 405 may contain other numbers of locations and thus the tags may contain a corresponding number of bits. Tagging logic 410 may include counter logic (not shown) which keeps track of the current tags for the non-posted and response control commands which have been stored in virtual channel FIFO buffer 405. The tags may be assigned according to an algorithm. Generally, the respective non-posted or response counters are incremented upon receipt of a posted control command if at least one "blockable" non-posted or response control command was received previous to the current posted control command and after a previous posted control command. As used herein, a non-posted or response control command is not blockable if the PPW bit is set identifying that the non-posted or response control command may pass a posted control command in virtual channel FIFO buffer 405. Thus, the PPW bit may act as a flag bit overriding the incrementing of tag values during the tagging of control commands and may override the tag values later during arbitration.

To illustrate the use of the tagging algorithm, Table 1 illustrates the receipt order and tagging of several control commands. It is noted that nine commands are shown for discussion purposes and that other numbers of control commands may have been used. In this example, the PPW bit is equal to zero upon receipt by tagging logic 410. The first column of Table 3 shows the order of receipt of the nine control commands. The second column shows the type of command received. The third column shows the state of the PPW bit. The fourth column shows the UID of the control command. The fifth column shows the tag assigned to the non-posted and response commands and the sixth and seventh columns show the non-posted and response commands' counter values. As described above, the posted control command receives two tags: the values shown in the current counter values for the respective non-posted and response counters.

TABLE 1

| Receive Order | Control Command | PPW Bit | Unit ID | Tag Value | Non-Posted Counter | Response Counter |
|---|---|---|---|---|---|---|
| 1 | Posted 1 | 0 | 1 | | 0 | 0 |
| 2 | Response 1 | 0 | 1 | 0 | 0 | 0 |
| 3 | Posted 2 | 0 | 1 | | 0 | 1 |
| 4 | Non-Posted 1 | 0 | 1 | 0 | 0 | 1 |
| 5 | Response 2 | 0 | 1 | 1 | 0 | 1 |
| 6 | Non-Posted 2 | 0 | 1 | 0 | 0 | 1 |
| 7 | Posted 3 | 0 | 1 | | 1 | 2 |
| 8 | Response 3 | 0 | 1 | 2 | 1 | 2 |
| 9 | Non-Posted 3 | 0 | 1 | 1 | 1 | 2 |

In row 1, upon receiving the Posted 1 control command, the counters are zero. In row 2, since the response counter is zero, a zero tag value is assigned to Response 1. In row 3, upon receiving Posted 2 control command, since a blockable response command was previously received after a previous posted command, the Response counter is incremented. In row 4, since the Non-Posted counter is zero, a zero tag value is assigned to Non-Posted 1. In row 5, the Response counter is still a one, thus a tag value of one is assigned to Response 2. In row 6, since the Non-Posted counter is still zero, a zero tag value is assigned to Non-Posted 2. In row 7, upon receiving Posted 3, the Response counter and the Non-Posted counter are both incremented. In row 8, a tag value of two is assigned to Response 3. In row 9, since the Non-Posted counter now contains a value of one, a tag value of one is assigned to Non-Posted 3. It is noted that the same Unit ID is shown for each control command for simplicity. A discussion of how the tagging algorithm handles control commands having different Unit IDs follows below in conjunction with the description of Table 3.

Table 2 illustrates how the PPW bit may affect the tagging of the received control commands shown in Table 1. If the PPW bit is set for a given non-posted or response control command received by tagging logic 410, then that control command is considered non-blockable and so the next posted control command received will not cause the respective counter to increment. For example, in row 2 of Table 2, the PPW bit is set for Response 1. Thus in row 3, when Posted 2 control command is received, the Response counter is not incremented. However, even though the PPW bit is set for Non-posted 2, the Posted 3 control command causes both the Non-Posted and Response counters to increment. This is because the Non-Posted 1 control command was received with the PPW bit clear after the last posted control command and before the current posted control command, thus satisfying the tagging rules for incrementing the counter. (The tagging rules state that at least one blockable control command will cause the respective counter to increment). It is noted that although the PPW bit is described as set to indicate that a non-posted or response control command may pass a posted control command, it is contemplated that in other embodiments the logic may be reversed such that a cleared bit is indicative that a non-posted or response control command may pass a posted control command.

TABLE 2

| Receive Order | Control Command | PPW Bit | Unit ID | Tag Value | Non-Posted Counter | Response Counter |
|---|---|---|---|---|---|---|
| 1 | Posted 1 | 0 | 1 | | 0 | 0 |
| 2 | Response 1 | 1 | 1 | 0 | 0 | 0 |
| 3 | Posted 2 | 0 | 1 | | 0 | 0 |
| 4 | Non-Posted 1 | 0 | 1 | 0 | 0 | 0 |
| 5 | Response 2 | 0 | 1 | 0 | 0 | 0 |
| 6 | Non-Posted 2 | 1 | 1 | 0 | 0 | 0 |
| 7 | Posted 3 | 0 | 1 | | 1 | 1 |
| 8 | Response 3 | 0 | 1 | 1 | 1 | 1 |
| 9 | Non-Posted 3 | 0 | 1 | 1 | 1 | 1 |

As described above in conjunction with FIG. 1, packets traveling in different virtual channels generally may not physically conflict with one another but may logically conflict due to ordering rules. In addition, a given packet or command that is in one I/O stream may not conflict with a packet or command from another I/O stream. However, also due to ordering rules, packets traveling in different I/O streams may get blocked by packets in a different virtual channel. Since the PPW bit is used in deciding if a control command is blockable, tagging logic 410 may use this PPW bit property to reduce latencies for selected control commands moving through virtual channel FIFO buffer 405.

Tagging logic 410 is configured to compare the Unit IDs of all received posted control commands with each received response or non-posted control command when assigning tag values. At any given time, there may be control commands from one or more I/O streams awaiting arbitration cycles. If there are no posted control commands stored within the posted queue from the same I/O stream as a given non-posted or response control command, then the given non-posted or response control command may be allowed to be processed ahead of any posted control command during an arbitration cycle. One way to efficiently handle this is to compare Unit IDs and to set the PPW bit for a non-posted or response control command that has a Unit ID that doesn't match a Unit ID of any posted control command currently stored within the posted queue. Table 3 illustrates how the tagging algorithm may assign tag values to control commands when there are control commands having different Unit IDs stored within virtual channel FIFO buffer 405.

TABLE 3

| Receive Order | Control Command | PPW Bit | Unit ID | Tag Value | Non-Posted Counter | Response Counter |
|---|---|---|---|---|---|---|
| 1 | Posted 1 | 0 | 1 |   | 0 | 0 |
| 2 | Response 1 | 0 | 1 | 0 | 0 | 0 |
| 3 | Posted 2 | 0 | 1 |   | 0 | 1 |
| 4 | Non-Posted 1 | 1 | 2 | 0 | 0 | 1 |
| 5 | Response 2 | 1 | 3 | 1 | 0 | 1 |
| 6 | Non-Posted 2 | 0 | 1 | 0 | 0 | 1 |
| 7 | Posted 3 | 0 | 1 |   | 1 | 1 |
| 8 | Response 3 | 0 | 1 | 1 | 1 | 1 |
| 9 | Non-Posted 3 | 1 | 4 | 1 | 1 | 1 |

Rows 1, 2 and 3 are the similar to that described in Table 1. However in row 4, the Unit ID of Non-Posted 1 is a two. Since there are no posted control commands with a Unit ID of two currently in the Posted queue, the PPW bit is set for Non-Posted 1. Further, Non-Posted 1 is now considered non-blockable by tagging logic 410 of FIG. 4. In row 5 of Table 3, Response 2 is assigned a tag value of one since the Response counter was incremented when the Posted 2 control command was received. Also, Response 2 has a Unit ID of three and since there are no posted control commands with a Unit ID of three currently in the Posted queue, the PPW bit is set for Response 2. Further, Response 2 is now considered non-blockable. In row 6, Non-Posted 2 is assigned a tag value of zero and is considered blockable by Tagging logic 410 since its Unit ID is 1, which matches the Unit IDs of existing Posted commands. In row 7, in response to receiving Posted 3, the Non-Posted counter is incremented, enabled by previously receiving Non-Posted 2. In row 8, Response 3 is assigned a tag value of one. In row 9, Non-Posted 3 receives a tag value of one since the Non-Posted counter contains a value of one. Non-Posted 3 also has a Unit ID of four. Since there are no posted control commands with a Unit ID of four currently in the Posted queue, the PPW bit is set for Non-Posted 3. Further, Non-Posted 3 is now considered non-blockable by tagging logic 410.

Referring back to FIG. 4, when control commands reach the zero or "output" location in virtual channel FIFO buffer 405, arbitration logic unit 420 may be configured to arbitrate between the three virtual channel buffers to pick a winning control command. During arbitration, arbitration logic unit 420 may be configured to pick a winning control command from virtual channel FIFO buffer 405 by comparing the tags appended to each control command and by checking the PPW bit. In addition, arbitration logic unit 420 may check destination buffers to ensure that a given channel is not blocked. If any virtual channel is blocked, then that channel may not participate in that arbitration cycle. If all three channels are open for arbitration, then the arbitration may take place between the posted channel and either the non-posted or the response channels individually. The non-posted and response channels may be selected for arbitration in a round robin fashion. In the event that there are no control commands in the posted channel, then arbitration logic unit 420 may arbitrate between the non-posted and response channels in a round robin fashion.

Arbitration logic unit 420 may compare the tag values of the posted control command and either the response or non-posted control command. If the tag values are equal, then the posted channel may be selected as the winner. If the tag values are not equal, then either the response or non-posted control command, whichever is participating in that arbitration cycle, may be selected as the winner. In either case, if the PPW bit is set for a given control command, then that control command may be processed ahead of a posted control command regardless of the tag values. Thus, tagging logic 410 setting the PPW bit based upon I/O stream and Unit ID may reduce latencies associated with control commands being blocked by posted control commands that are not in the same I/O stream. It is noted that while the PPW bit in the control commands stored in virtual channel FIFO buffer 405 may be modified by tagging logic 410, the PPW bit of the corresponding packet(s) stored in buffers of receivers 110 and 120 of FIG. 2 may not be modified.

As described above in conjunction with FIG. 1, packets that originate at or are forwarded through a host bridge may contain a Unit ID of the host bridge. In addition, peer-to-peer packets that are reflected back by the host bridge may also have a Unit ID of the host bridge. In one embodiment, the Unit ID of the host bridge may be a zero. Thus, downstream request packets that originate at or are forwarded through the host bridge may have a Unit ID of zero. Response packets however, may contain the Unit ID of the originating node. Therefore, since it may not be possible to distinguish to which I/O stream a given packet belongs, downstream latency reduction by setting the PPW bit may not be possible.

In one embodiment, similar tagging and arbitration logic may be implemented in both upstream and downstream applications. Thus, if any posted command stored within the posted queue has the Unit ID of the host bridge (e.g. zero), then tagging logic 410 considers it a match for all received non-posted and response control command Unit IDs, and the PPW bit may not be set in any control commands.

In an alternative embodiment, an I/O node may contain configuration logic which may allow scheduler 400 to be configured as either an upstream or a downstream scheduler. In one implementation, the configuration logic may automatically detect whether scheduler 400 is used in the upstream or downstream flow. Alternatively, the configuration logic may be configured by a user. However the logic is configured, when configured as a downstream scheduler, the Unit ID comparison logic may be bypassed, thereby preventing reordering based on Unit IDs.

Numerous variations and modifications will become apparent to those skilled in the art once the above disclosure is fully appreciated. It is intended that the following claims be interpreted to embrace all such variations and modifications.

What is claimed is:

1. An arbitration mechanism of an input/output node of a computer system, said mechanism comprising:

a buffer circuit including a first buffer corresponding to a posted virtual channel and a second buffer corresponding to second virtual channel, wherein each buffer is configured to store control commands belonging to a corresponding virtual channel, wherein each of said control commands includes an identifier value indicative of a corresponding source device;

a tag circuit coupled to said buffer circuit and configured to generate a tag value for each of said control commands prior to storage within said buffer circuit, wherein said tag value is indicative of an order of receipt by said tag circuit of each of said control commands relative to other control commands and is dependent upon said identifier value; and an arbitration circuit coupled to said buffer circuit and configured to arbitrate between said first buffer and said second buffer dependent upon said tag value of each of said control commands;

wherein, during arbitration, each control command belonging to said second virtual channel further includes a flag bit which indicates that said arbitration circuit may select independently of said tag values a given control command having said flag bit set.

2. The mechanism as recited in claim 1, wherein said tag circuit is further configured to compare said identifier values of said control commands stored within said first buffer to said identifier value of each of said control commands belonging to said second virtual channel that is received.

3. The mechanism as recited in claim 2, wherein said tag circuit is further configured to set said flag bit of said given one of said control commands belonging to said second virtual channel if said identifier value of said given one of said control commands is different than said identifier values of said posted control commands stored within said first buffer.

4. The mechanism as recited in claim 3, wherein said second virtual channel is a non-posted channel.

5. The mechanism as recited in claim 4 further comprising a third buffer corresponding to a third virtual channel.

6. The mechanism as recited in claim 5, wherein said third virtual channel is a response channel.

7. The mechanism as recited in claim 6, wherein said tag circuit is further configured to generate and assign said tag value to each of said control commands belonging to said non-posted channel using a current value of a counter associated with said non-posted channel.

8. The mechanism as recited in claim 7, wherein said tag circuit is further configured to generate and assign said tag value to each of said control commands belonging to said response channel using a current value of a counter associated with said response channel.

9. The mechanism as recited in claim 8, wherein said tag circuit is further configured to assign said tag value corresponding to said current value of said counter associated with said response channel and said tag value corresponding to said current value of said counter associated with said non-posted channel to each of said control commands belonging to said posted channel.

10. The mechanism as recited in claim 9, wherein said tag circuit is further configured to increment said counter associated with each of said non-posted and response channels in response to said tag circuit receiving a control command belonging to said posted channel preceded by a control command belonging to said non-posted and said response channel, respectively.

11. The mechanism as recited in claim 10, wherein said arbitration circuit is further configured to compare said tag values assigned to said control commands stored in said buffers corresponding to said posted channel and said non-posted channel and to determine if said tag values are equal.

12. The mechanism as recited in claim 11, wherein said arbitration circuit is further configured to process said control command stored in said first buffer corresponding to said posted channel in response to determining that said tag values are equal and said flag bit is not set.

13. The mechanism as recited in claim 12, wherein said arbitration circuit is further configured to process said control command stored in said second buffer corresponding to said non-posted channel in response to determining that said tag values are not equal.

14. The mechanism as recited in claim 10, wherein said arbitration circuit is further configured to compare said tag values assigned to said control commands stored in said buffers corresponding to said posted channel and said response channel and to determine if said tag values are equal.

15. The mechanism as recited in claim 14, wherein said arbitration circuit is further configured to process said control command stored in said first buffer corresponding to said posted channel in response to determining that said tag values are equal and said flag bit is not set.

16. The mechanism as recited in claim 15, wherein said arbitration circuit is further configured to process said control command stored in said third buffer corresponding to said response channel in response to determining that said tag values are not equal.

17. The mechanism as recited in claim 10, wherein said arbitration circuit is further configured to arbitrate between said control commands stored in said buffers corresponding to said non-posted channel and said response channel in response to said first buffer corresponding to said posted channel being empty.

18. A method of tagging commands in an input/output node of a computer system, said method comprising:

receiving control commands belonging to a posted virtual channel and a second virtual channel, wherein each of said control commands includes an identifier value indicative of a corresponding source device;

generating a tag value for each of said control commands, wherein said tag value is indicative of an order of receipt of each of said control commands relative to other control commands and is dependent upon said identifier value;

storing said control commands in a first buffer corresponding to said posted virtual channel and a second buffer corresponding to said second virtual channel; and arbitrating between said first buffer and said second buffer dependent upon said tag value of each of said control commands;

wherein, during arbitration, selecting independently of said tag values a given control command belonging to said second virtual channel and having a flag bit set.

19. The method as recited in claim 18 further comprising comparing identifier values of said control commands stored within said first buffer to said identifier value of each of said control commands belonging to said second virtual channel that is received.

20. The method as recited in claim 19 further comprising setting said flag bit if said identifier value of said given one of said control commands is different than said identifier values of said control commands stored within said first buffer.

* * * * *